Oct. 7, 1958   J. N. SCHUMACHER   2,855,283
SYSTEM FOR CHARGING A MIXTURE OF AIR AND FUEL INTO
THE INTAKE PIPE OF AN INTERNAL COMBUSTION ENGINE
Filed Jan. 13, 1956   3 Sheets-Sheet 1
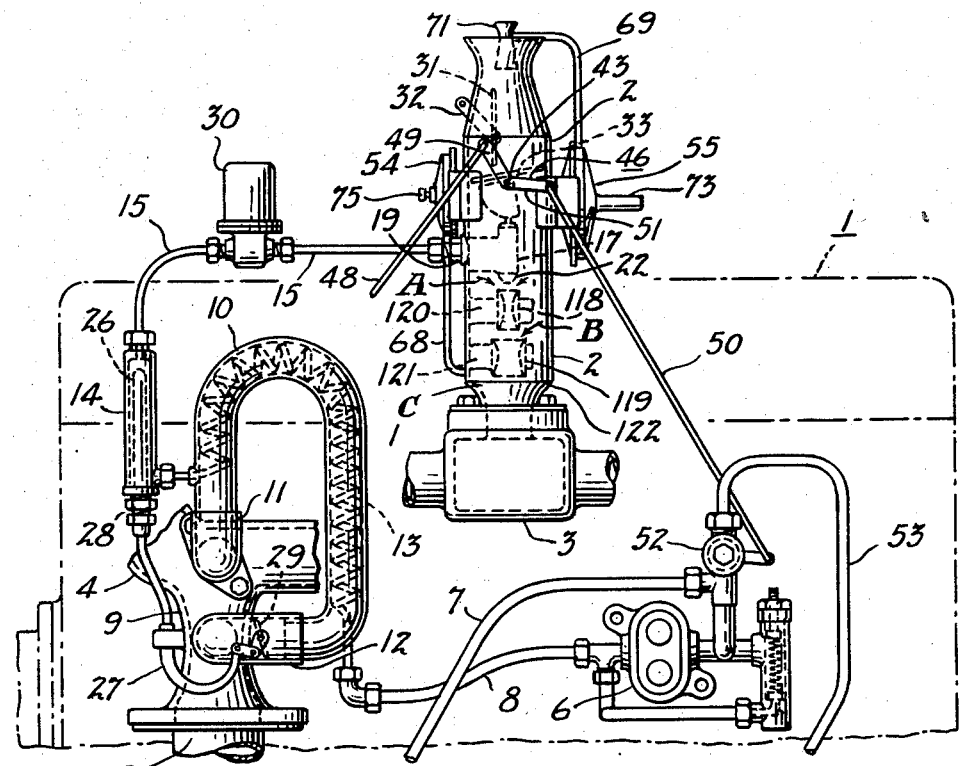
*Fig. 1*
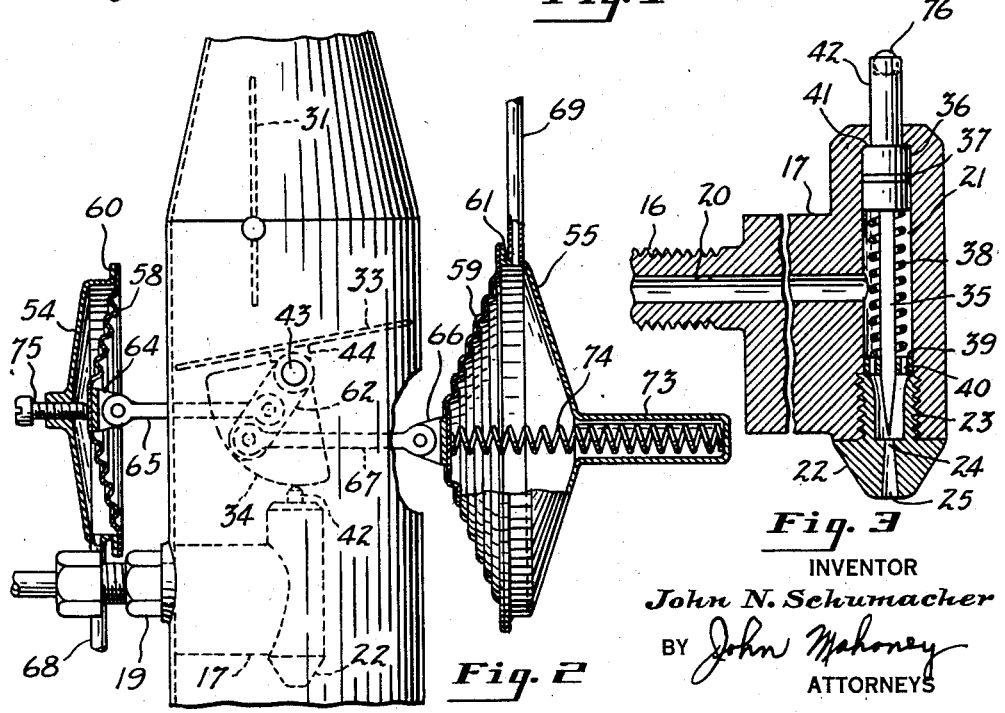
*Fig. 2*   *Fig. 3*
INVENTOR
John N. Schumacher
BY John Mahoney
ATTORNEYS

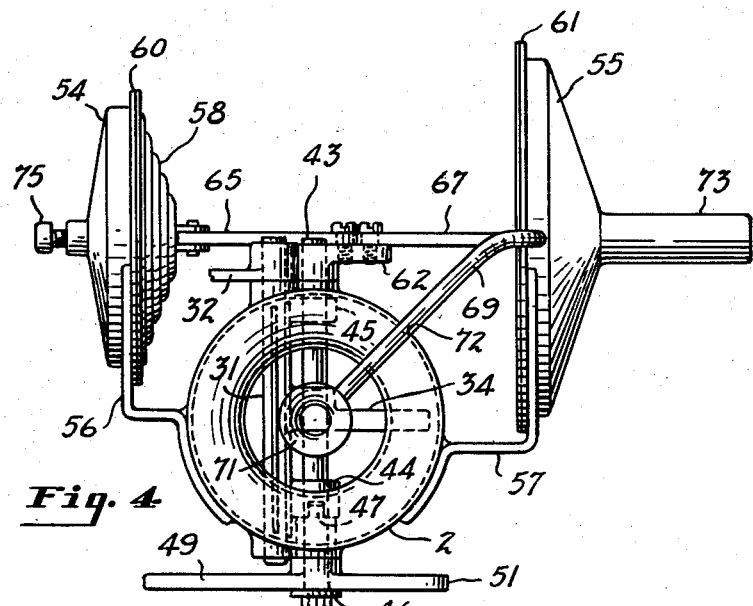

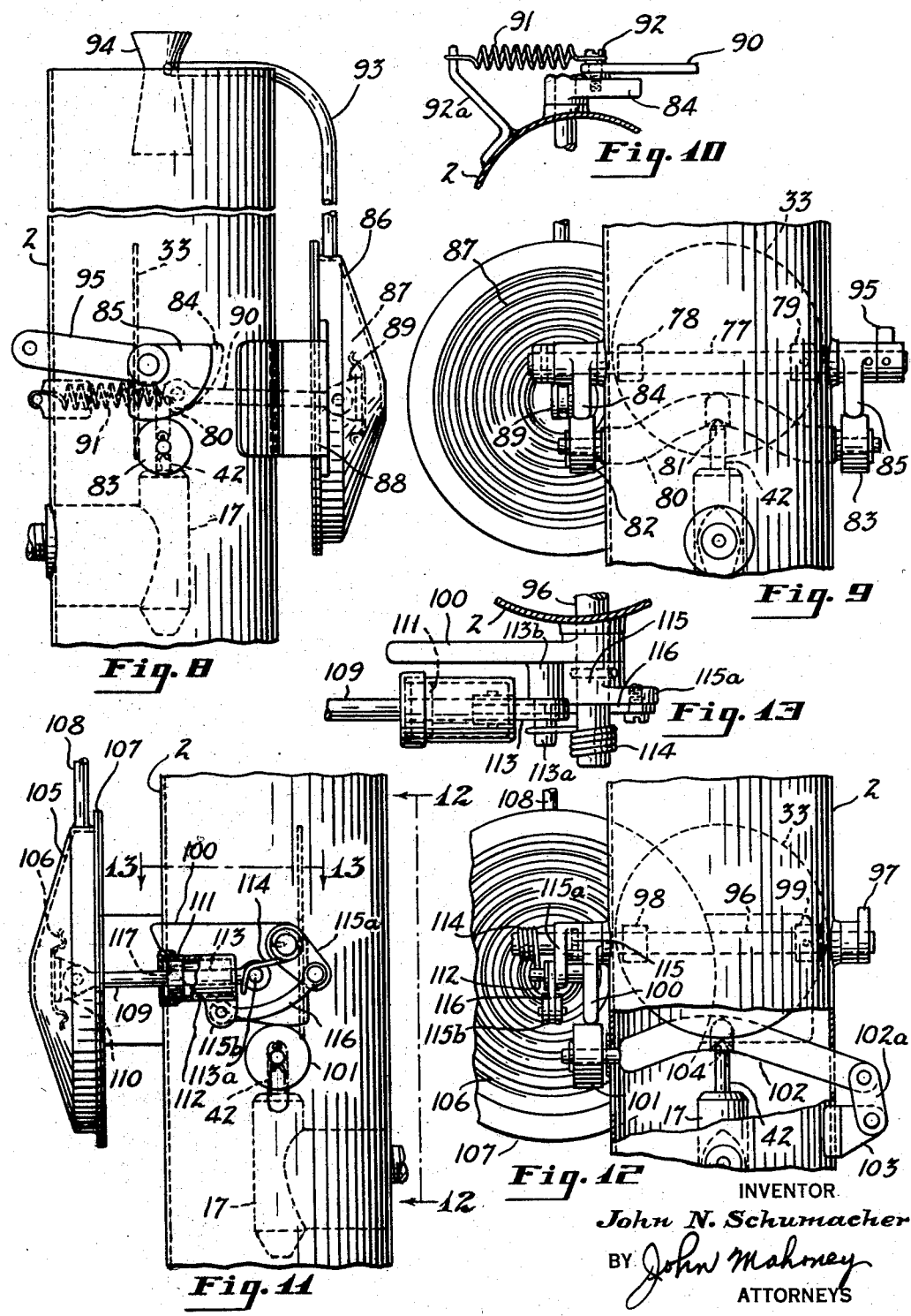

United States Patent Office 2,855,283
Patented Oct. 7, 1958

2,855,283

SYSTEM FOR CHARGING A MIXTURE OF AIR AND FUEL INTO THE INTAKE PIPE OF AN INTERNAL COMBUSTION ENGINE

John N. Schumacher, Cleveland, Ohio, assignor of fifty percent to Dan W. Duffy, Cleveland, Ohio Application January 13, 1956, Serial No. 559,070

11 Claims. (Cl. 48—184)

The present invention relates to a system in combination with an internal combustion engine for supercharging the engine and more particularly to improved means for regulating the proportion of air and fuel that is passed to the combustion chamber or combustion chambers of the engine, irrespective of the load or speed of the engine, or the density of the air in which the engine is running.

In my copending application, Ser. No. 536,250, filed in the United States Patent Office on September 23, 1955, which has now matured into Patent No. 2,796,855, a system in combination with an internal combustion engine is disclosed in which a fuel for the engine, such as gasoline, or gasoline mixed with a supplementary fuel or an antiknock liquid, or a supplementary fuel having antiknock properties, is passed in heat exchange relation with a portion of the exhaust gases of the engine and is maintained in a liquid state under pressure at comparatively high temperatures by means of a pump connected in the fuel line.

As disclosed in my prior application, when the ignition system of the engine is turned on, the liquid fuel is in communication with a valve casing arranged in an air inlet passage leading to the combustion chambers of the engine which valve casing is provided with a fuel outlet orifice controlled by a needle valve part that is normally held in a position to maintain the orfice open by suitable means, such as by the fuel pressure in the casing which if desired may be supplemented by a spring. In accordance with my prior application, the needle valve part is moved to a position in which it nearly closes the orifice by a cam connected to a throttle valve when the throttle valve is moved to its nearly closed position and the cam is of such contour that it will permit the fuel valve to partly or fully open when the throttle valve is moved to its partly or fully open position. In my prior application, the fuel outlet orifice from the valve casing is also arranged in alignment with one or more nozzles which are shaped in the form of venturi tubes and the fuel upon passing through the venturi tube or venturi tubes causes the induction of a comparatively large amount of air into the combustion chambers of the engine, thus increasing the power of the engine.

While the system disclosed in my prior application is satisfactory for combustion engines which operate at a substantially constant load and speed, when a heavy load is placed upon the engine and its speed is reduced even when the throttle valve is in its fully open position, it is apparent that a less amount of air is drawn into the engine than when the engine is running at high speed and consequently a mixture of air and fuel is obtained which contains too high a proportion of fuel. My improved system is also effective in maintaining the proper proportion of air and fuel when the density of the air in which the engine is running varies, such as when the engine is installed in an airplane which flies at different altitudes.

It is therefore the object of the present invention to provide means in combination with an internal combustion engine in which fuel is supplied to the engine in a vaporous state, for regulating the amount of fuel which is supplied to the engine when the load upon the engine varies so that a proper mixture of air and fuel will be supplied to the combustion chamber or combustion chambers of the engine at all times, irrespective of the speed or the load upon the engine, or the density of the air in which the engine is running.

My invention will be better understood by reference to the accompanying drawings in which:

Fig. 1 is a side elevational view of one form of my improved apparatus;

Fig. 2 is an enlarged elevational view of my improved apparatus showing parts in section and the throttle valve in a substantially closed position;

Fig. 3 is an enlarged cross sectional view of a valve casing utilized in my improved apparatus;

Fig. 4 is a plan view of my improved apparatus;

Fig. 5 is an elevational view with parts in section and parts in elevation of my improved apparatus when the throttle valve and fuel valves are in their fully open positions;

Fig. 6 is a detail cross sectional view of a portion of the air inlet passage showing parts in elevation;

Fig. 7 is a cross sectional view taken on a plane passing through the line 7—7 of Fig. 6;

Fig. 8 is an elevational view of a modification of my improved apparatus with parts broken away;

Fig. 9 is a view similar to that shown in Fig. 8 with the parts at an angle of 90° from that shown in Fig. 8;

Fig. 10 is a detail view of part of the apparatus disclosed in Figs. 8 and 9;

Fig. 11 is a side elevational view showing another modification of my invention with parts broken away;

Fig. 12 is a view similar to that shown in Fig. 11 with the apparatus at an angle of 90° therefrom; and Fig. 13 is a plan view taken on a plane passing through the line 13—13 of Fig. 11, looking in the direction of the arrows.

In my prior application to which reference has been made, an internal combustion engine is shown in which means are provided for maintaining a fuel, such as gasoline or a mixture of gasoline and an antiknock liquid or supplementary fuel, or both, in a liquid state under pressure at a comparatively high temperature and passing the liquid fuel through a comparatively small orifice or opening arranged in an air inlet passageway leading to the combustion chamber or combustion chambers of an internal combustion engine. In my prior application, means are also provided for inducting a comparatively large volume of air into the air inlet passageway when a throttle valve arranged therein is open to increase the pressure of the air and fuel passing to the combustion chamber or combustion chambers of the engine.

In accordance with the present invention, means in combination with the system disclosed in my prior application are provided for regulating the amount of fuel that is supplied to the engine when the load upon the engine, the speed of the engine, or the density of the air in which the engine is running is varied.

The system, including the air inlet passageway, the means for heating the fuel and maintaining it in a liquid state under pressure, and the means for inducting air into the air passageway, is similar to that disclosed in my prior application. As illustrated, the numeral 1 designates an internal combustion engine which may be of any desired type, such as stationary or movable, and which may be provided with a single or multiple combustion chambers. As shown, the engine is provided with a plurality of cylinders and combustion chambers to which a mixture of fuel and air flows through an inlet pipe 2 connected to an inlet manifold 3 leading to the combustion chambers of the engine, which engine is also provided with the usual exhaust manifold which is connected by exhaust pipes 4 and 5 to the muffler of the engine in the usual manner and means are provided for supplying fuel, such as gasoline or a mixture of gasoline and an antiknock liquid or a supplementary fuel, or both, to the air inlet pipe or passageway leading to the combustion chamber or combustion chambers of the engine at a comparatively high temperature and pressure and passing the liquid fuel through a comparatively small orifice or opening arranged in the air inlet passage. For this purpose, a fuel pump 6 is provided, the shaft of which may be driven in any suitable manner, such as by an electric motor or from the cam or crank shaft of the engine. As shown in Fig. 1, the fuel is pumped through conduit means 7 from a suitable supply tank, not shown, to the intake side of the pump and is forced from the discharge side of the pump through suitable conduit means, such as pipe 8, and means are provided for heating the fuel and maintaining it in a liquid state under pressure at a comparatively high temperature. For this purpose, the fuel is passed in heat exchange relation with a portion of the exhaust gases of the engine in such manner that the fuel will be heated to a comparatively high temperature while being confined under sufficient pressure to maintain the fuel in a liquid state.

To regulate the amount of exhaust gases which flow in heat exchange relation with the fuel, the portion of the exhaust gases from the engine which are in heat exchange relation with the fuel may be diverted from the main exhaust pipe in any convenient manner, such as by providing a restriction in the main exhaust pipe and a branch pipe, or as shown more particularly in Fig. 1, the main exhaust pipe 4 may be arranged in the form of a venturi tube having a restricted central portion 9 and a by-pass pipe 10 may be connected to exhaust pipe 4 in such manner that part of the exhaust gases flow through the by-pass pipe. For this purpose, means, such as an elbow pipe 11, is connected to exhaust pipe 4 at a portion close to the entrance of the exhaust gases from the engine and a pipe section 12 is connected to the restricted portion 9 of the exhaust pipe by suitable means, such as bolts, and by-pass pipe 10 in turn is connected to the elbow pipe 11 and the pipe section 12 by suitable means, such as welding. The upper portion of by-pass pipe 10 is connected to the enlarged part and the lower portion is connected to the restricted part of exhaust pipe 4 and consequently a pressure differential exists between the entrance and the outlet ends of the by-pass pipe 10 and for heating the fuel and maintaining it at a comparatively high temperature, a conduit means 13 having one end connected to the discharge pipe 8 of pump 6 extends through the by-pass pipe 10 to which it may be secured in a suitable manner, such as by welding, and is preferably in the form of a coil to provide a comparatively large surface which is in heat exchange relation with the exhaust gases passing through by-pass pipe 10. The outlet portion of conduit means 13 is also secured to the by-pass pipe 10 by suitable means, such as welding, and is connected to a casing 14 which, in turn, is connected by conduit means 15 to a threaded fitting 16, see Fig. 3, of a valve casing 17 arranged within the inlet pipe 2 by suitable means, such as a coupling 18. As shown more fully in my prior application, the threaded fitting 16 of valve casing 17 extends loosely through an aperture in pipe 2 and is held in place by a nut 19 which engages the outer surface of pipe 2 to permit a small vertical adjustment of the valve casing, it being understood that conduit means 15 is flexible enough to permit of this adjustment.

Valve casing 17 is provided with a conduit 20 extending through the threaded fitting 16 which conduit is in communication with the liquid fuel in conduit means 15 and with a chamber 21 arranged in valve casing 17.

Valve casing 17 is also provided with a nozzle 22 having a cylindrical portion 23 and a central passageway 25, the cylindrical portion 23 being in threaded engagement with the lower portion of valve casing 17 and in alignment with the chamber 21. As shown, nozzle 22 is provided with a comparatively small outlet orifice 24 which communicates with a passageway 25 in nozzle 22 and while the passageway 25 may be of any desired shape, such as cylindrical, as shown, it is conical in shape to slightly relieve the pressure upon the liquid fuel flowing through orifice 24. The orifice 24 is of insufficient size to relieve the pressure in conduit means 13, 15 and 20, and in the chamber 21 of valve casing 17 caused by the force of pump 6 and consequently the fuel within the heating system is maintained in a liquid state under pressure at a comparatively high temperature. When the liquid fuel flows through passageway 25, however, the pressure upon the fuel is somewhat relieved and upon issuing from the passageway 25, the pressure upon the liquid fuel is completely released and the liquid fuel immediately vaporizes and issues from passageway 25 at high velocity in the form of a jet.

As disclosed in my prior application, means are also provided for regulating the temperature to which the fuel is heated in by-pass pipe 10 and for this purpose, a bulb 26 is arranged in casing 14 which bulb is connected to one end of a Bourdon tube 27 by suitable means, such as a tube fitting 28. The other end of Bourdon tube 27 is connected to a valve 29 arranged adjacent the outlet opening in by-pass pipe 10 or as shown, it may be arranged in the pipe section 12 which is connected to exhaust pipe 4. The bulb 26 is in heat exchange relation with the fuel flowing through casing 14 and contains an expansible gas or liquid which when heated to a sufficient temperature moves Bourdon tube 27 to a sufficient extent to cause it to close or partly close valve 29, thereby limiting or terminating the flow of exhaust gases through by-pass pipe 10 to limit the temperature to which the fuel is heated. On the other hand, when the liquid or gas within the Bourdon tube contracts, the Bourdon tube contracts and opens or partly opens valve 29, thus increasing the flow of exhaust gases through by-pass pipe 10 to increase the temperature to which the fuel in conduit means 13 is heated.

A solenoid actuated valve 30 is also arranged in conduit means 15 which is normally maintained in closed position by a suitable means, such as a spring, not shown, and which opens when the solenoid is energized. The solenoid in valve 30 may, for instance, be connected to the ignition system of the engine so that when the ignition to the engine is turned on, the solenoid is energized to move the valve to an open position, thus permitting the fuel to flow through conduit means 15 to the valve casing 17. A butterfly valve 31 may also be provided in the air inlet pipe 2 to which an arm 32 is connected which may be actuated by a rod in the usual manner to choke or limit the amount of air that flows through the inlet pipe 2 while the engine is being started.

A throttle valve 33 is also arranged within the conduit means 2 for regulating the amount of air that flows to the combustion chamber or combustion chambers of the engine and in accordance with the present invention, means associated with the throttle valve is provided for regulating the amount of fuel that flows through the orifice 24 so that the desired combustible mixture of air and fuel will be provided at all times, irrespective of the speed or load upon the engine, or the density of air in which the engine is running, and while various means may be provided for this purpose, one form of my invention is shown in Figs. 1 to 7 of the drawings.

As illustrated in Figs. 1 and 2, a cam 34 is provided and means associated with cam 34 and the air inlet pipe 2 are provided for regulating the amount of fuel passing through orifice 24 and passageway 25 of valve casing 17 to provide the proper combustible mixture of air and fuel at any desired speed of the engine. As illustrated more particularly in Fig. 3 of the drawing, a needle valve part 35 is arranged in chamber 21 of valve casing 17 which is provided at its upper end with a piston 36 having a packing, such as an O-ring 37, therein to seal the piston from the casing. Needle valve part 35 is normally held in its open position by the pressure of fuel within casing 17 which pressure may be assisted, if desired, by a spring 38, one end of which abuts against a bushing 39 arranged in chamber 21 in seating engagement with the cylindrical portion of nozzle 22 and the other end of which engages the lower portion of piston 36.

Bushing 39 is provided with a central opening through which one end of the stem of needle valve part 35 extends and with a plurality of spaced openings 40 through which the liquid fuel flows to orifice 24 and the central passageway 25 in nozzle 22. Piston 36 is reduced at its upper end to provide a shoulder 41 for engaging the upper end of casing 17 and a rod 42 which extends through an opening in the upper end of casing 17, and means associated with cam 34 is provided for regulating the amount of fuel that flows through orifice 24 and passageway 25 of casing 17 in accordance with the amount and density of air that is drawn through the inlet opening in the passageway 2, irrespective of the speed or load on the engine or the density of the air in which it is running.

As shown more particularly in Figs. 1 and 6, a rotatable shaft 43 extends transversely through the air inlet pipe 2 upon which throttle valve 33 is rotatably mounted in any desired manner. As shown, the throttle valve 33 is provided with spaced collars 44 and 45 which are rotatably mounted on shaft 43. Cam 34 is fixed to shaft 43 and is provided with a curved outer edge portion which is shaped to depress rod 42 of the needle valve part 35 when shaft 43 is moved with a rotary motion in a clockwise direction from the position shown in Fig. 5 to the position shown in Fig. 2 to nearly close orifice 24 when the parts are in the position shown in Fig. 2 or to permit the needle valve part to open orifice 24 and passageway 25 when the shaft 43 and cam 34 are moved with a rotary motion in a counterclockwise direction from the position shown in Fig. 2 to the position shown in Fig. 5. As shown, the throttle valve 33 is movable independently of shaft 43 and cam 34 and for this purpose, a bell crank lever 46, see Figs. 1 and 6, is pivotally mounted on shaft 43 and is provided with a pair of teeth 47 for engaging collar 44 to move the throttle valve toward its closed position when a rod 48 connected to one arm 49 of the bell crank lever is moved in one direction and to move the throttle valve toward its open position when rod 48 is moved in the opposite direction. A second rod 50 is connected to the other arm 51 of bell crank lever 46 and is movable with arm 48 to gradually open or close a valve 52 controlling a supply of a supplementary fuel or an antiknock liquid, or a mixture thereof, which when valve 52 is in its partly or fully open position, may be drawn into the system by pump 6 through conduit means 53 from a suitable source of supply as described more particularly in my copending application to which reference has been made.

The throttle valve 33 is normally maintained in a closed position by spring means associated with the throttle or accelerator in the usual manner at which time valve 52 which regulates the supply of supplementary fuel or antiknock liquid, or a mixture thereof, is also closed and in accordance with the present invention, means are provided for regulating the position of cam 34 to regulate the amount of fuel which flows to the combustion chamber or combustion chambers of the engine when the throttle valve is in various positions and the speed of the engine, the load on the engine, or the density of the air in which the engine is running varies. For this purpose, a pair of casings 54 and 55 are provided which may be of any desired shape. As shown, they are circular in shape and are arranged in opposed relation to each other.

Casings 54 and 55 may be supported in any desired manner, such as by brackets 56 and 57, respectively, each of which brackets may be welded or otherwise secured to the inlet pipe 2. Each of the casings 54 and 55 is provided with a diaphragm 58 and 59, respectively, the outer periphery of each of which diaphragms is welded or otherwise secured to an outwardly extending annular flange 60 and 61, respectively, on the respective casings. The diaphragms may be of any suitable flexible material, such as leather or a resilient metal. As shown, they are formed of thin corrugated metal and each diaphragm forms a hermetic seal with the casing to which it is secured.

As illustrated in the drawings, the end of shaft 43 opposite to that on which the bell crank lever 46 is mounted, also extends beyond the inlet pipe 2 and an arm 62 is fixed to this extension by suitable means, such as a pin 63, and means associated with diaphragms 58 and 59 are provided for maintaining the cam 34 in a position to regulate the position of needle valve part 35. For this purpose, a bracket 64 is secured to the central portion of diaphragm 58 to which bracket one end of a link 65 is secured, the other end of link 65 being pivotally secured to arm 62 and in a like manner, a bracket 66 is secured to the central portion of diaphragm 59 to which bracket one end of a link 67 is secured, the other end of link 67 being pivotally secured to the arm 62 outwardly of the connection at which link 65 is secured to arm 62.

As shown more particularly in Figs. 1, 2 and 5 of the drawings, means associated with the inlet pipe 2 and each casing is provided for regulating the pressure of air within each of the casings 54 and 55. As shown, conduit means 68 is provided, one end of which is in communication with casing 54 and the other end of which is connected to pipe 2 beyond throttle valve 33 and a second conduit means 69 is provided, one end of which is in communication with casing 55 and the other end of which is in communication with a venturi tube having a restricted portion intermediate its ends which, if desired, may be the restricted portion 70 of the inlet pipe 2, or a separate nozzle or venturi tube 71 arranged at or within the inlet end portion of pipe 2 which nozzle or venturi tube may be supported in place in any suitable manner. As shown, venturi tube is supported in place by conduit means 69 which is provided with an indentation 72 into which a portion of the upper edge of the inlet pipe extends.

When the throttle valve 33 is in its nearly closed position as shown in Fig. 2 and the engine is idling, air pressure within casing 55 will be only slightly below atmospheric pressure and because of the low pressure in the inlet pipe beyond throttle valve 33 due to the suction of the engine, the pressure within casing 54 will be below atmospheric pressure, and means are provided for maintaining cam 34 in a position to cause needle valve part 35 to nearly close orifice 24 in valve casing 17 when the throttle valve is in its nearly closed position. For this purpose, casing 55 is provided with an extension 73 to receive one end of a spring 74, the other end of which engages the diaphragm 59 opposite bracket 66 to urge and move arm 62 and cam 34 with a rotary motion in a clockwise direction to cause needle valve part 35 to nearly close orifice 24. When the throttle valve is in its nearly closed position, the pressure within casing 54 is below atmospheric pressure and consequently diaphragm 58 may be forced to the left as shown in Fig. 2 of the drawings and to prevent complete closing of the orifice 24 of valve casing 17, casing 54 is provided with a screw 75, the inner end of which engages the diaphragm 58 opposite to bracket 64 when diaphragm 58 is moved to the left as shown in Fig. 2 of the drawings. When the throttle valve 33 is opened, however, air is drawn through inlet pipe 2, the upper portion of which may be in the shape of a venturi tube and through the venturi tube 71 to the restricted intermediate portion of which conduit means 69 is connected and consequently air will be drawn from casing 55 creating a partial vacuum therein. At this time the pressure within the inlet pipe between the throttle valve and the inlet pipe of the engine will be increased, thereby increasing the pressure within casing 54 and diaphragm 59 will be moved to the right as shown in Figs. 2 and 5 against the force of spring 74, thereby moving cam 34 with a rotary motion to a position in which it permits valve rod 42 to rise under the influence of the liquid fuel and the spring 38 in casing 17 to increase the amount of fuel passing to the combustion chamber or combustion chambers of the engine. It will be noted that rod 42 is provided with a recess at its upper end to receive a ball bearing 76 upon which cam 34 rides to reduce the friction and in this connection, it may be stated that spring 74 has a very light tension so that the cam may be readily moved with a rotary motion to permit the needle valve 35 to rise and open orifice 24, thereby permitting an increased amount of fuel to flow to the combustion chamber or combustion chambers of the engine.

In the event that the engine is installed in an airplane which is flying at high altitudes, the pressure of the air upon the outer surface of diaphragm 59 will be less and consequently the influence of spring 74 in moving the cam 34 in a clockwise direction will be greater than when the airplane is at low altitudes and spring 74 will therefore move cam 34 in a clockwise direction to decrease the amount of fuel flowing through the outlet orifice 24 to provide the proper combustible mixture of air and fuel when the air in which the engine is running has less density than at sea level or low altitudes.

It will be noted that diaphragm casing 55 is larger than diaphragm casing 54 and has greater leverage upon arm 62 than diaphragm casing 58 because it is connected to the outer end portion of arm 62. Diaphragm casing 55 is made larger than diaphragm casing 58 because the air passing through the restricted portion of the inlet pipe or the restricted portion of venturi tube 71 creates a suction that is less than the suction of the engine beyond the throttle valve. According to the invention, the sizes of diaphragm casings 54 and 55 relative to each other, the points at which they are connected to arm 62, and the contour of cam 34, are such that the desired amount of fuel which is passed into the inlet passageway of the engine when mixed with the air flowing through the inlet pipe will provide the proper combustible mixture, irrespective of the engine speed, the load on the engine, or the density of the air in which it is running.

Although the apparatus disclosed in Figs. 2 and 4 to 7 provide an effective means for regulating the amount of fuel that flows through the outlet opening in valve casing 17, it will of course be understood that I do not desire to be limited to the specific structure shown therein as various means may be provided which are responsive to the amount or density of air flowing through the inlet pipe 2 to regulate the amount of fuel that issues from valve casing 17 to provide the proper combustible mixture of air and fuel, irrespective of the load upon the engine, the speed of the engine, or the density of the air surrounding the engine while it is running.

For instance, there is illustrated in Figs. 8 to 10 of the drawings, another form of my improved apparatus for effecting this result. In this modification, the inlet pipe 2, valve casing 17, and the rod 42 of needle valve 35 have been designated by the same numerals as in the previous modification, and it will of course be understood that the inlet pipe 2 is connected to the inlet manifold of the engine in the same or substantially the same manner as shown in Fig. 1, that the valve casing 17 is connected through the threaded fitting 16 to conduit means 15 in the manner shown in Figs. 1 and 3, and that the valve parts arranged in valve casing 17 are similar to those shown in Fig. 3.

As illustrated in Figs. 8 and 9 of the drawings, a shaft 77 extends through the inlet pipe 2 to which the throttle valve 33 arranged within pipe 2 is secured by suitable means, such as collars 78 and 79, at least one of which is fixed to the throttle valve 33, and arranged below the shaft 77 is a bar 80 having an arcuate-shaped center portion provided with a conical recess 81 to receive the upper end of rod 42 of the needle valve 35, which in this modification is provided with a conical upper end portion to pivot within the conical recess 81. The opposite ends of bar 80 extend through elongated openings in inlet pipe 2 to permit vertical movement of bar 80 to cause needle valve part 35 to nearly close or partly close outlet orifice 24.

When the ignition to the engine is turned on, rod 42 of needle valve part 55 and bar 80 are urged upwardly by the pressure of fuel and the force of spring 32 in valve chamber 21 of valve casing 17 to open orifice 24, and means are provided to depress bar 80 to move needle valve part 35 to nearly close outlet orifice 24 when throttle valve 35 is in its nearly closed position and the engine is idling. For this purpose, the opposite ends of bar 80 extend beyond pipe 2 and are provided with rotatably mounted bearings 82 and 83 and the opposite end portions of shaft 77 likewise extend beyond the air inlet pipe 2 and rotatably mounted upon one end portion of shaft 77 is a cam 84 and on its other end portion is a cam 85 which is fixed to shaft 77 and means associated with bearing 82 and shaft 77 are provided for regulating the amount of fuel that passes through the outlet orifice of valve casing 17 to provide the proper combustible mixture with the air flowing through inlet pipe 2, irrespective of the speed or load upon the engine or the density of the air in which the engine is running. For this purpose, a casing 86 is provided which may be secured to the inlet pipe by suitable means, such as a bracket 88, one side of which casing is closed by a diaphragm 87 which may be formed of leather or a resilient corrugated metal. The other side of diaphragm 87 is provided at its central portion with a bracket 89, to one end of which a link 90 is secured, the opposite end of link 90 being pivotally connected to cam 84 and resilient means are provided for urging cam 84 to a position in which it depresses bearing 82 and bar 80 to maintain needle valve part 35 in valve casing 17 in a position to nearly close the fuel outlet orifice 24 when the throttle valve is in its nearly closed position. As shown in Fig. 10, a spring 91 is provided having one end connected to a pintle 92 secured to cam 84 and upon which pintle link 90 is pivotally mounted, the other end of spring 91 being anchored to a bracket 92a which is welded or otherwise secured to pipe 2.

To provide the proper amount of fuel when the throttle valve is partly or fully opened, irrespective of the speed or load upon the engine or the density of the air surrounding the engine, conduit means 93 is provided, one end of which is in communication with casing 86 and the other end of which is connected to the restricted portion of inlet pipe 2 which may be in the form of a venturi tube as shown in Fig. 5 or to the restricted portion of a nozzle or venturi tube 94 which may be arranged within inlet pipe 2 or supported upon the inlet end of pipe 2 as shown in Figs. 5 and 8. To move the throttle valve, an arm 95 is provided which is connected to shaft 77 and which may be straight or in the form of a bell crank lever as shown in Fig. 1. The arm 95 may be connected to the throttle or accelerator of the engine by suitable means, such as a rod, as shown in Fig. 1 and if the arm is in the form of a bellcrank lever, an additional rod may be provided as shown in Fig. 1 for regulating the opening of a valve to control the admission of an antiknock liquid or a supplementary fuel, or a mixture of both, into the system.

In the construction shown in Figs. 8 to 10, when the throttle valve 33 is moved to its nearly closed position by arm 95, cam 85 is moved with a rotary motion to a position in which it applies pressure upon bearing 83 and one of the end portions of bar 83 to depress rod 42. At this time, however, the amount of air passing through the venturi tube 94 is small and the air within casing 86 is at substantially or nearly atmospheric pressure and spring 91 is under sufficient tension to move cam 84 with a rotary motion in a clockwise direction to depress bearing 82 and the other end of bar 80 downwardly, it being understood that the contour of cams 84 and 85 are such that when the throttle valve is in its nearly closed position, the needle valve 35 in casing 17 is held in a position to nearly close orifice 24 to provide only a sufficient amount of fuel which when mixed with the small amount of air flowing past the throttle valve provides the proper combustible mixture to enable the engine to idle. When throttle valve 33 is moved to its partly or fully open position, however, cam 85 is moved with a rotary motion in a counterclockwise direction as shown in Fig. 8 which permits bearing 83 to rise under the influence of the fuel and the spring 38 in valve casing 17 and when the throttle valve is opened, the increased amount of air passing through the venturi tube 94 draws air from casing 86 forming a partial vacuum therein and diaphragm 87 is moved to or toward its dotted line position as shown in Fig. 8 against the force of spring 91 and diaphragm 87 moves cam 84 with a rotary movement in a counterclockwise direction as shown in Fig. 8 which permits bearing 82 and the other end portion of bar 80 to rise thereby permitting more fuel to pass through the outlet orifice 24 of casing 17. It will of course be understood that the diaphragm 86 is of such size and the contour of cams 84 and 85 are so shaped that the proper amount of fuel will flow through the outlet orifice 24 of casing 17 to provide the proper combustible mixture with the air flowing through the inlet pipe at all engine speeds, irrespective of the speed or the load upon the engine.

In the event that the engine is installed in an airplane flying at high altitudes in which the density of the air is less than at low altitudes, the air pressure upon the external surface of diaphragm 87 will be less and consequently the tension of spring 91 will prevent the diaphragm from moving toward the right when a partial vacuum is formed in casing 86 to the same extent as when the density of the air exerting pressure upon the exterior surface of diaphragm 87 is greater than at high altitudes.

Another form of my invention is shown in Figs. 11 to 13 which is somewhat similar to that shown in Figs. 8 to 10. As illustrated, a shaft 96 extends across inlet pipe 2 which pipe is similar to and is connected to the inlet manifold of the engine in the same manner as shown in Fig. 1. Shaft 96 has end portions extending beyond the inlet pipe, one of which is provided with an arm 97 which may be straight as shown and connected to a rod extending to the throttle or accelerator of the engine or arm 97 may be in the form of a bell crank lever, one arm of which is connected to the accelerator and the other arm of which is connected to a valve for controlling the entrance of an antiknock liquid or a supplementary fuel, or both, into the intake port of the pump.

As shown in Fig. 12, the throttle valve 33 is provided with collars 98 and 99 surrounding shaft 96 within the inlet pipe, at least one of which collars is connected to shaft 96 so that the throttle valve 33 will move with shaft 96 and mounted for rotary movement upon the opposite end of shaft 96 is cam 100 which engages a bearing 101 that is rotatably mounted upon a bar 102. Bar 102 extends across inlet pipe 2 and its other end portion extends through an opening in casing 2 and is connected to one end of a link 102a. The other end of link 102a is pivotally mounted upon a bracket 103 secured to the outer face of inlet pipe 2. As shown, bar 112 has an arcuate portion provided with a conical seat 104 to receive the upper end portion of rod 42 of needle valve part 35 which rod also has a conically shaped end portion to pivot within the conical seat 104 of bar 102.

In this modification, means are also provided to regulate the amount of fuel which flows to the combustion chamber or the combustion chambers of the engine, irrespective of the load upon or the speed of the engine, or the density of the air surrounding the engine. As shown, a casing 105 is provided which is closed by a diaphragm 106, the periphery of which diaphragm is welded or otherwise secured to an outwardly extending flange 107 on the casing. Conduit means 108 also extends from the casing to the restricted portion of the inlet pipe or to a restricted portion of a nozzle or venturi tube arranged within or supported upon the inlet pipe 2 in the manner shown in Figs. 5 and 8. In this modification, a link 109 is also provided, one end of which is threaded or otherwise connected to a bracket 110 secured to the central outer face portion of diaphragm 106 and the other end of which is threaded or otherwise connected to a piston 111 which floats within a cylinder 112 and connected to the opposite side of the piston 111 is a link 113 which is pivotally mounted upon a pin 113a extending outwardly from a boss 113b on the cam.

In this modification when the throttle valve is in its nearly closed position, the air within valve casing 105 is substantially at or slightly below atmospheric pressure, and resilient means are provided for urging cam 100 to a position in which it depresses bearing 101 and bar 102 to maintain the needle valve part in a position to nearly close orifice 24 so that only sufficient fuel flows through outlet casing 17 to permit the engine to idle when the ignition system is turned on. For this purpose, a spring 114 is provided, one end of which is secured to shaft 96 and the other end of which engages pin 113a to maintain cam 100 in a position in which it depresses needle valve part 35 to nearly close the orifice 24 in valve casing 17. When the throttle valve is opened, however, air passing through the inlet pipe or the venturi tube associated therewith, draws air from casing 105, forming a partial vacuum therein and link 109, piston 111, and link 113 are moved to the left as shown in Fig. 11, moving cam 100 with a rotary motion to the position shown in Fig. 11, thus permitting the needle valve part 35 to open against the force of spring 114. The amount of fuel that flows into the combustion chamber or combustion chambers of the engine is therefore dependent upon the amount of air passing through the inlet pipe 2, and in accordance with my invention, the size of casing 105 and the contour of cam 100 are so formed that the amount of fuel flowing into the combustion chamber or combustion chambers of the engine will be in such relative proportion to the air that a proper combustible mixture of air and fuel will be obtained, irrespective of the speed of the engine or the load thereon. If the engine is installed in an airplane flying at high altitudes in which the density of the air is less than at sea level or at lower altitudes, the pressure of the air upon the external face of diaphragm 106 will be less and consequently cam 100 will not be moved to the left as shown in Fig. 11 to the same distance against the force of spring 114 at high altitudes as at lower altitudes and consequently the amount of fuel flowing through the outlet valve of the casing 17 will be less at higher altitudes than at lower altitudes.

In the modification shown in Figs. 11 to 13, means are also provided to open the fuel valve quickly in the event that the throttle valve is opened quickly. For this purpose, a hub 115 is secured to shaft 96 and has an arm 115a extending outwardly therefrom to which one end of a link 116 is pivotally mounted, the other end of link 116 being pivotally connected to a bifurcated lug 115b extending downwardly from cylinder 112 and consequently if the throttle valve is opened quickly, cylinder 112 is moved to compress the air therein which acts upon piston 111 to force the diaphragm and cam 100 quickly to the left. Spring 114 acting upon link 113 then moves cam 100 with a rotary motion in the opposite direction to the desired position to provide the proper mixture of air and fuel, the air flowing through a small opening 117 in piston 111 to relieve the pressure in the cylinder. If desired, similar means may be provided to increase the movement of link 90 in the modification shown in Figs. 8 to 10 when the throttle valve is quickly opened.

As disclosed more particularly in my pending application, means are also provided to induct a comparatively large volume of air into the pipe or air passageway when the throttle valve is open to increase the pressure and velocity of the air and fuel passing to the combustion chamber or combustion chambers of the engine and for this purpose, one or more nozzles 118 and 119 are arranged in the passageway provided by pipe 2. As shown, nozzles 118 and 119 are in the form of venturi tubes and are arranged in alignment with the opening 25 in nozzle 22 through which the fuel vapors issue and are supported in place in the passageway by suitable means, such as thin vanes 120 and 121, respectively. The inlet orifice of venturi tube 118 is preferably spaced from nozzle 22 of the valve casing 17 and the inlet orifice of venturi tube 119 is preferably spaced from the outlet orifice of venturi tube 118 although if desired, the inlet orifice of venturi tube 118 may be arranged substantially even with nozzle 22 and the inlet orifice of venturi tube 119 may be arranged substantially even with the outlet orifice of venturi tube 118. It will also be noted that the portion 122 of inlet pipe 2 which is connected to the inlet manifold 3 of the engine is also in the form of a venturi tube and consequently when the throttle valve 33 is open and fuel in the form of vapors issue at a high velocity from nozzle 25, a comparatively large volume of air is inducted into venturi tube 48 as indicated by the arrow A. The mixture of air and fuel issuing from venturi tube 118 also causes a comparatively large volume of air to be inducted into venturi tube 119 as indicated by the arrows B. The mixture of air and fuel passing from the outlet orifice of venturi tube 118 into the venturi-shaped portion 122 of pipe 2 also causes a comparatively large volume of air to be inducted into the portion 122 of pipe 2 as indicated by the arrows C and consequently a large volume of air and fuel at high pressure and velocity flows into the combustion chamber or combustion chambers of the engine.

What is claimed is:

1. A system for charging a mixture of air and fuel into the intake pipe of an internal combustion engine comprising means for providing an air inlet passageway leading to the intake pipe of the engine, means for maintaining a fuel in the liquid state under pressure, a throttle valve arranged in said passageway, a valve casing arranged within said air inlet passageway between the throttle valve and the intake pipe of the engine, said valve casing being in communication with said fuel and having an outlet orifice through which the fuel may be injected into said passageway, a valve part for closing the outlet orifice of said casing, means for normally urging said valve part to its open position, means for applying pressure upon said valve part to substantially close the outlet orifice of the valve casing when said throttle valve is in its substantially closed position, and means responsive to the amount and density of the air flowing through that portion of the air inlet pipe between the air inlet opening and said throttle valve for releasing pressure upon said valve part to a sufficient extent to regulate the quantity of fuel that flows through the outlet orifice of said valve casing at any position of said throttle valve between its partly and fully open position.

2. A system for charging a mixture of air and fuel into the intake pipe of an internal combustion engine comprising means for providing a passageway leading from the atmosphere to the intake pipe of the engine including an air inlet pipe having a restricted portion, a throttle valve arranged in said passageway between the restricted portion of said pipe and the intake pipe of the engine, means for maintaining a fuel in the liquid state under pressure, a valve casing arranged within said air inlet passageway between the throttle valve and the intake pipe of the engine and said valve casing being in communication with said fuel and having an outlet orifice through which the fuel may be injected into said passageway, a valve part for closing the outlet orifice of the casing, means for urging the valve part to its open position, means for applying pressure upon said valve part to substantially close the outlet orifice of the valve casing when said throttle valve is in its substantially closed position, and means responsive to the amount and density of air flowing through the restricted portion of said air inlet pipe for releasing pressure upon said valve part to a sufficient extent to regulate the quantity of fuel that flows through the outlet orifice of said casing at any position of said throttle valve between its partly and fully open positions.

3. A system for charging a mixture of air and fuel into the intake pipe of an internal combustion engine comprising means for providing an air inlet passageway leading from the atmosphere to the intake pipe of the engine, at least a portion of which air inlet passageway is in the form of a venturi tube, a throttle valve arranged in said passageway between the venturi tube and the intake pipe of the engine, means for heating and maintaining a fuel in the liquid state under pressure, a valve casing arranged within said air inlet passageway between the throttle valve and the intake pipe of the engine, said valve casing being in communication with said fuel and having an outlet orifice through which said fuel flows and from which it issues in the vaporous state at high velocity in the form of a jet when the orifice in said valve casing is at least partly open, a movable valve part for closing the outlet orifice of said casing, means for urging the valve part to its open position, means for applying pressure to the valve part for maintaining it in a position to substantially close the outlet orifice of said casing when the throttle valve is in its substantially closed position, and said pressure applying means being movable in response to and to an extent depending upon the amount and density of air flowing through the venturi tube of the inlet passageway to a position in which it permits the valve part in said casing to open to such an extent that a proper combustible mixture of air and fuel will flow to the intake pipe of said engine at any position of said throttle valve between its partly and fully open positions.

4. A system for charging a mixture of air and fuel into the intake pipe of an internal combustion engine comprising means for providing an air inlet passageway leading from the atmosphere to the intake pipe of the engine, at least a portion of said air inlet passageway being in the form of a venturi tube having a restricted portion intermediate its ends, means for heating and maintaining a fuel in the liquid state at a comparatively high temperature and pressure, a throttle valve arranged in said air inlet passageway between the venturi tube and the intake pipe of the engine, a valve casing arranged in said air inlet passageway between the throttle valve and the intake pipe of the engine, said valve casing being in communication with said fuel and having an outlet orifice through which said fuel flows and from which it issues in the vaporous state at high velocity in the form of a jet when the orifice in said valve casing is at least partly open, a valve part for closing the outlet orifice of said casing, means for urging said valve part to its open position, a movable cam for engaging said valve part, resilient means for urging said cam to a position in which it maintains the valve part in a position to substantially close the outlet orifice of said casing when the throttle valve is in its substantially closed position, and means in response to and depending upon the amount and density of air flowing through said venturi tube for moving said cam against the force of said resilient means to a sufficient extent to regulate the quantity of fuel that flows through the outlet orifice of said conduit means at any position of said throttle valve between its partly and fully open positions.

5. A system for charging a mixture of air and fuel into the intake pipe of an internal combustion engine comprising means for providing an air inlet passageway leading from the atmosphere to the intake pipe of the engine, at least a portion of which is in the form of a venturi tube having a restricted portion intermediate its ends, means for heating and maintaining a fuel in a liquid state at a comparatively high temperature and pressure, a throttle valve arranged in the air inlet passageway between the throttle valve and the intake pipe of the engine, a valve casing arranged in said air inlet passageway between the throttle valve and the intake pipe of the engine, said valve casing being in communication with said liquid fuel and having an outlet orifice through which said fuel flows and from which it issues in the vaporous state at high velocity in the form of a jet when the outlet orifice of said casing is at least partly open, a valve part for closing the outlet orifice of said casing, means for urging said valve part to its open position, a movable cam associated with said valve part, resilient means for urging said cam to a position for maintaining said valve part in a position to substantially close the outlet orifice of the valve casing when the throttle valve is in its substantially closed position, a diaphragm casing arranged outside of the air inlet passageway, a diaphragm for closing said casing, a link having one end connected to said diaphragm and its opposite end pivotally associated with said cam, and conduit means extending between the diaphragm casing and the restricted portion of said venturi tube for drawing air from the diaphragm casing in an amount depending upon the amount and density of the air flowing through said venturi tube when the throttle valve is in at least a partly open position to provide a partial vacuum in the diaphragm casing, and said diaphragm being movable when a partial vacuum is formed in the diaphragm casing against the force of said resilient means to move said cam to a sufficient extent to regulate the quantity of fuel that flows through the outlet orifice of said casing at any position of said throttle valve between its partly and fully open positions.

6. Apparatus as defined in claim 5 in which a piston is secured to said link which piston has a small aperture therein, a cylinder in which said piston floats, and means associated with said shaft and said cylinder for moving said cylinder to compress the air between one end of the cylinder and the piston when the throttle valve is quickly moved to an open position and the pressure of air upon said piston being effective in quickly moving said cam to a position in which its pressure upon the valve part is released to a sufficient extent to permit the valve part to increase the amount of fuel flowing through the outlet orifice of said valve casing.

7. Apparatus as defined in claim 5 in which the means for providing an air inlet passageway includes a pipe, a shaft extending across said pipe to which said throttle valve is secured and an end portion extending beyond the pipe upon which said cam is rotatably mounted and in which the means for depressing the valve part includes said cam and a movable bar extending across said pipe having an end portion extending beyond said pipe below the extension on said shaft and a central portion engaging said valve part, a bearing mounted upon that end portion of the bar that extends beyond the pipe, said cam being in engagement with said bearing and exerting sufficient pressure thereon to maintain said valve part in its substantially closed position when the throttle valve is in its closed position, and said cam being movable with a rotary motion on said shaft to release the pressure upon said bearing and bar in response to the partial vacuum that is formed in said diaphragm casing when the throttle valve is in at least a partly open position for permitting said valve part to open to a sufficient extent to regulate the quantity of fuel that flows through the outlet orifice of said casing at any position of said throttle valve between its partly and fully open positions.

8. Apparatus as defined in claim 7 in which the opposite end of said bar extends beyond and is pivotally mounted upon said pipe.

9. Apparatus as defined in claim 5 in which the means for providing an air inlet passageway includes a pipe, a shaft extending across said pipe to which said throttle valve is secured and said shaft having end portions extending beyond the pipe, upon one of which end portions said cam is rotatably mounted, a second cam secured to the opposite end of said shaft and being movable therewith, and in which the means for depressing said valve part includes said cams and a bar extending across said pipe having end portions extending beyond said pipe and an intermediate portion engaging said valve part, bearings mounted upon each end portion of said bar, one of which bearings is engaged by the first-mentioned cam and the other bearing being engaged by the second cam, and said second cam being movable with a rotary motion when the throttle valve is moved to at least a partly open position to partly release the pressure on said valve part and the first mentioned cam being movable with a rotary motion on said shaft to release the pressure upon the other bearing in response to the partial vacuum that is formed in said diaphragm casing when the throttle valve is in at least a partial open position to release the pressure upon said valve part to a sufficient extent to regulate the quantity of fuel that flows through the outlet orifice of said casing at any position of said throttle valve between its partly and fully open positions.

10. A system for charging a mixture of air and fuel into the intake pipe of an internal combustion engine comprising means for providing an air inlet passageway leading to the intake pipe of the engine, at least a portion of which is in the form of a venturi tube having a restricted portion intermediate its ends, means for heating and maintaining a fuel in the liquid state at a comparatively high temperature and pressure, a valve casing arranged in said air inlet passageway, said valve casing being in communication with said fuel and having an outlet orifice through which said fuel flows and from which it issues in a vaporous state at high velocity in the form of a jet when the outlet orifice in said valve casing is at least partly open, a valve part for closing said fuel outlet orifice, means for urging said valve part to its open position, a shaft extending across the air inlet passageway between said casing and said venturi tube, a throttle valve mounted for rotary movement on said shaft between open and closed positions, means including a cam fixed to said shaft for engaging and depressing said valve part, resilient means for urging said cam to a position in which it maintains said valve part in a position to substantially close said orifice when the throttle valve is in its substantially closed position, a diaphragm casing arranged outside of the air inlet passageway, a diaphragm for closing said casing, a link having one end secured to said diaphragm and its other end pivotally associated with said cam, and conduit means extending between the diaphragm casing and the restricted portion of said venturi tube for drawing air from the diaphragm casing to provide a partial vacuum therein and said diaphragm being movable when a partial vacuum is formed in said diaphragm casing against the force of said resilient means when said throttle valve is in at least a partly open position to move said cam to a position in which said valve part is maintained in a position in which the amount of fuel flowing through the outlet orifice of said valve casing varies in accordance with the amount and density of air flowing through said venturi tube to provide a proper combustible mixture of air and fuel.

11. A system as defined in claim 10 including a second diaphragm casing mounted in opposed relation to the first mentioned diaphragm casing and being closed by a second movable diaphragm, a bar secured to said shaft and the link secured to the diaphragm of the first mentioned diaphragm casing having its other end pivotally secured to the outer end portion of said bar and a second link pivotally secured to said bar inwardly of the first link and its other end secured to the diaphragm of the second diaphragm casing, and conduit means communicating with the second diaphragm casing and the air inlet passageway at a position between the throttle valve and the intake pipe of the engine for assisting said resilient means in maintaining said cam in a position to depress said valve part to substantially close the outlet orifice of said casing when the throttle valve is substantially closed and said second diaphragm being movable in the same direction as the first-mentioned diaphragm to aid in moving said cam to a position in which it releases pressure upon said valve part when the throttle valve is in at least a partly open position.

References Cited in the file of this patent

UNITED STATES PATENTS

| | | |
|---|---|---|
| 1,564,039 | Whitehorn | Dec. 1, 1925 |
| 1,869,821 | Moore | Aug. 2, 1932 |